United States Patent
Kawakita et al.

(10) Patent No.: US 9,478,802 B2
(45) Date of Patent: Oct. 25, 2016

(54) NONAQUEOUS ELECTROLYTE SECONDARY BATTERY

(71) Applicant: SANYO Electric CO., LTD, Daito-shi, Osaka (JP)

(72) Inventors: Akihiro Kawakita, Hyogo (JP); Takeshi Ogasawara, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 14/423,965

(22) PCT Filed: Oct. 30, 2013

(86) PCT No.: PCT/JP2013/006417
§ 371 (c)(1),
(2) Date: Feb. 25, 2015

(87) PCT Pub. No.: WO2014/068969
PCT Pub. Date: May 8, 2014

(65) Prior Publication Data
US 2015/0214542 A1    Jul. 30, 2015

(30) Foreign Application Priority Data

Oct. 31, 2012 (JP) ................................ 2012-240102

(51) Int. Cl.
| | |
|---|---|
| H01M 4/36 | (2006.01) |
| H01M 4/38 | (2006.01) |
| H01M 4/48 | (2010.01) |
| H01M 4/62 | (2006.01) |
| H01M 10/052 | (2010.01) |
| H01M 4/525 | (2010.01) |

(52) U.S. Cl.
CPC .............. *H01M 4/366* (2013.01); *H01M 4/38* (2013.01); *H01M 4/483* (2013.01); *H01M 4/62* (2013.01); *H01M 4/386* (2013.01); *H01M 4/525* (2013.01); *H01M 4/622* (2013.01); *H01M 10/052* (2013.01); *Y02T 10/7011* (2013.01)

(58) Field of Classification Search
CPC ........ H01M 4/366; H01M 4/62; H01M 4/38; H01M 4/483; H01M 4/525; H01M 10/052; H01M 4/386; H01M 4/622; Y02E 60/122
See application file for complete search history.

(56) References Cited

U.S. PATENT DOCUMENTS

| | | | |
|---|---|---|---|
| 2002/0114993 A1 | 8/2002 | Miyaki et al. | |
| 2006/0177739 A1* | 8/2006 | Endo | H01M 4/485 429/231.95 |
| 2007/0122694 A1* | 5/2007 | Yamaki | H01M 4/13 429/137 |
| 2013/0302689 A1* | 11/2013 | Jito | H01M 4/131 429/223 |

FOREIGN PATENT DOCUMENTS

| | | |
|---|---|---|
| JP | 8-236114 A | 9/1996 |
| JP | 2004-14134 A | 1/2004 |
| JP | 2007-134279 A | 5/2007 |
| JP | 4253853 B2 | 4/2009 |
| JP | 2009-211817 A | 9/2009 |
| WO | 2005/008812 A1 | 1/2005 |

OTHER PUBLICATIONS

English Translation of Written Opinion dated Feb. 4, 2014, issued in corresponding International Application No. PCT/JP2013/006417 (8 pages).
International Search Report dated Feb. 4, 2014, issued in corresponding application No. PCT/JP2013/006417.

* cited by examiner

*Primary Examiner* — Muhammad Siddiquee
(74) *Attorney, Agent, or Firm* — Westerman, Hattori, Daniels & Adrian, LLP

(57) ABSTRACT

The present invention aims to provide a nonaqueous electrolyte secondary battery having excellent charge discharge cycle characteristics in a high-temperature environment. The present invention relates to a nonaqueous electrolyte secondary battery which includes a positive electrode in which a positive electrode active material mixture layer is formed, a negative electrode in which a negative electrode active material mixture layer is formed, a nonaqueous electrolyte, and a separator, and in the above nonaqueous electrolyte secondary battery, on at least one surface of the positive electrode active material mixture layer and the negative electrode active material mixture layer, an inorganic particle layer containing a rare earth element compound is formed.

9 Claims, 1 Drawing Sheet

NONAQUEOUS ELECTROLYTE SECONDARY BATTERY

TECHNICAL FIELD

The present invention relates to a nonaqueous electrolyte secondary battery.

BACKGROUND ART

As a drive power source of the present mobile electronic apparatus, such as a mobile phone, a mobile personal computer, or a mobile music player, and furthermore, as a power source of a hybrid electric vehicle (HEV or PHEV) or an electric vehicle (EV), a nonaqueous electrolyte secondary battery represented by a lithium ion secondary battery having a high energy density and a high capacity has been widely used.

Since this nonaqueous electrolyte secondary battery itself generates heat when being used or charged, and in addition, since an apparatus using this nonaqueous electrolyte secondary battery also generates heat, the temperature thereof may be increased in some cases. In particular, when a plurality of nonaqueous electrolyte secondary batteries are collectively used as an assembled battery, heat is not uniformly dispersed, and the temperature may be locally increased in some cases. Hence, there has been desired a nonaqueous electrolyte secondary battery in which various types of battery characteristics are not degraded even in a high-temperature environment.

In order to improve various types of battery characteristics of the nonaqueous electrolyte secondary battery at a high temperature, various measures have been carried out. For example, the following Patent Document 1 has disclosed the invention of a nonaqueous electrolyte secondary battery in which in order to improve high-temperature charge storage characteristics, a protective layer containing alumina, silicon dioxide, zirconia, or a water-insoluble or a low-water soluble lithium salt is provided on at least one surface of a positive electrode plate and a negative electrode plate.

In addition, the following Patent Document 2 has disclosed the invention of a nonaqueous electrolyte secondary battery and a positive electrode active material in which in order to suppress a reaction between a positive electrode active material and a nonaqueous electrolyte solution at a high potential, a compound of an element of Group III of the periodic table is provided partially on the surfaces of positive electrode active material particles.

CITATION LIST

Patent Literature

Patent Document 1: Japanese Patent No. 4253853
Patent Document 2: International Publication No. WO2005/008812

SUMMARY OF INVENTION

Technical Problem

However, requirements for commercially available nonaqueous electrolyte secondary batteries are demanding, and cycle characteristics at a high temperature have been still desired to be improved as compared to those of related nonaqueous electrolyte secondary batteries.

According to one aspect of the present invention, a nonaqueous electrolyte secondary battery having excellent charge discharge cycle characteristics in a high-temperature environment can be provided by forming an inorganic particle layer containing a rare earth element on at least one surface of a positive electrode plate and a negative electrode plate.

Incidentally, the above Patent Document 1 has suggested neither a rare earth element compound contained in an inorganic particle layer provided as the protective layer on the positive electrode plate or the negative electrode plate, nor high-temperature cycle characteristics obtained thereby. In addition, the above Patent Document 2 has suggested neither a layered rare earth element compound provided on the surface of a positive electrode plate nor high-temperature cycle characteristics obtained thereby.

Solution to Problem

One aspect of the present invention comprises: a positive electrode in which a positive electrode active material mixture layer is formed, a negative electrode in which a negative electrode active material mixture layer is formed, a nonaqueous electrolyte solution, and a separator, and on at least one surface of the positive electrode active material mixture layer and the negative electrode active material mixture layer, an inorganic particle layer containing a rare earth element compound is formed.

Advantageous Effects of Invention

According to the nonaqueous electrolyte secondary battery of one aspect of the present invention, a nonaqueous electrolyte secondary battery having improved cycle characteristics in a high-temperature environment can be obtained.

DESCRIPTION OF EMBODIMENTS

Figure 1:
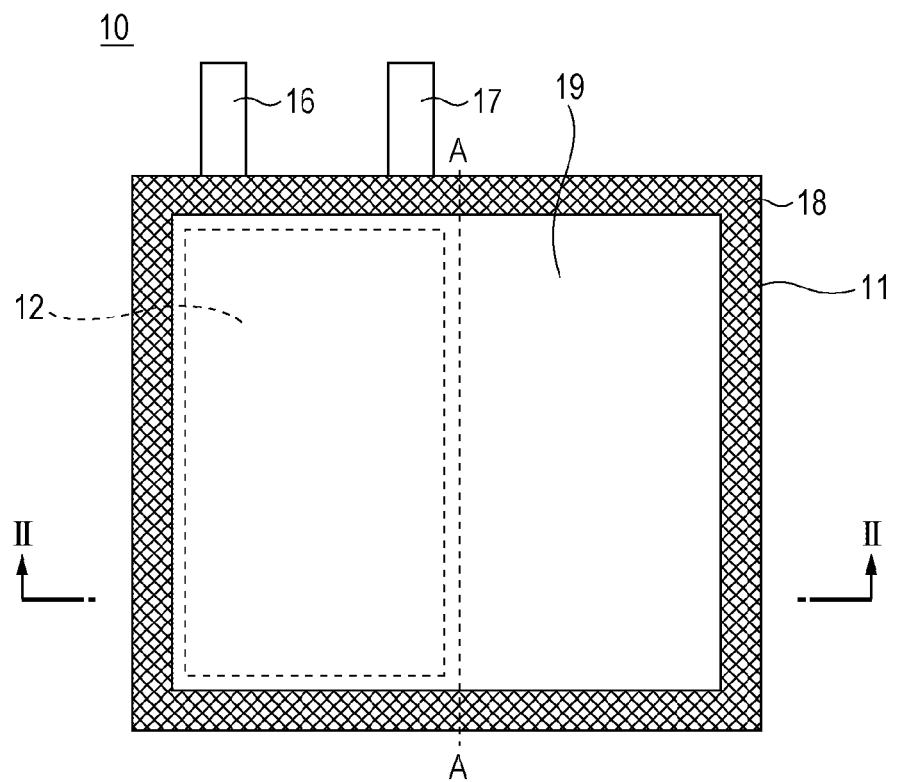
FIG. 1 is a plan view of a laminate type nonaqueous electrolyte secondary battery used in Experimental Example 1.

Hereinafter, embodiments for carrying out the present invention will be described in detail. However, the following embodiments will be described by way of example in order to embody the technical spirit of the present invention, and it is not intended to limit the present invention to those embodiments. In addition, various modifications and changes performed without departing from the technical spirit disclosed in the claims of the present invention may also be included in the present invention. First, a concrete method for manufacturing a nonaqueous electrolyte secondary battery as a laminate battery to be used in Experiment Example 1 will be described.

FIRST EXPERIMENT EXAMPLE

Experiment Example 1

Formation of Positive Electrode Plate

A lithium cobalt composite oxide ($LiCoO_2$) as a positive electrode active material was obtained in such a way that after lithium carbonate ($Li_2CO_3$) functioning as a lithium source and cobalt carbonate ($CoCO_3$) functioning as a cobalt source were mixed together in a mortar so that the molar ratio of Li to Co was 1:1, a heat treatment was performed at 950° C. for 10 hours in an air atmosphere, and a product obtained thereby was pulverized into a powder having an average particle diameter 17 μm.

Next, after the positive electrode active material powder prepared as described above, a carbon black (acetylene black) powder having an average particle diameter of 30 nm and functioning as a positive electrode conductor, and a poly(vinylidene fluoride) (PVdF) functioning as a positive electrode binder were added to N-methyl-2-pyrollidone (NMP) functioning as a dispersion medium so that the mass ratio of the positive electrode active material, the positive electrode conductor, and the positive electrode binder was 95:2.5:2.5, the mixture thus prepared was kneaded, so that a positive electrode active material mixture slurry was prepared.

After the above positive electrode active material mixture slurry was applied to two surfaces of aluminum foil (thickness: 15 μm, length: 340 mm, and width: 50 mm) functioning as a positive electrode collector so that the lengths of coating portions at a front surface side and a rear surface side were 280 mm and 205 mm, respectively, and the widths of the coating portions were each 50 mm, NMP was removed by drying, and rolling was then performed, so that positive electrode active material mixture layers were formed on the two surfaces of the positive electrode collector. In addition, at the portions at which the positive electrode active material mixture layers were formed on the two surfaces, the amount of the positive electrode active material mixture layers on the positive electrode collector was 48 mg/cm², and the thickness was 148 μm. After the positive electrode active material mixture layers were formed, an aluminum plate functioning as a positive electrode collector tab was connected to a non-coated portion which was located at an end portion of the positive electrode collector and on which no positive electrode active material mixture layer was provided.

Next, after an ethyl acrylate-acryl nitrile copolymer functioning as a binder was dispersed in water, a mixture in which aluminum oxide (AKP3000 (trade name)) and erbium oxide were mixed together at a mass ratio of 500:11 (at this ratio, the rate of the rare earth compound contained in an inorganic particle layer was 3.6 percent by mass on the rare earth element basis with respect to all the elements other than non-metal elements) was further dispersed in the above water.

A positive electrode plate on which the positive electrode active material mixture layers were formed was dipped in the dispersion thus obtained and was then dried, so that inorganic particle layers (thickness at one side surface: 4 μm) in each of which erbium oxide as the rare earth compound and aluminum oxide were mixed together were formed on the surfaces of the positive electrode active material mixture layers. Hence, the positive electrode plate was formed.

(Formation of Negative Electrode Plate)
(1) Preparation of Silicon Negative Electrode Active Material First, a polycrystalline silicon ingot was formed by a heat reduction method. In particular, while a silicon core placed in a metal reaction furnace (reduction furnace) was electrically heated to 800° C., a mixed gas containing refined hydrogen and a vapor of a highly refined pure monosilane ($SiH_4$) gas was allowed to flow through the furnace to precipitate polycrystalline silicon on the surface of the silicon core, so that a polycrystalline silicon ingot in the form of a bar having a large diameter was formed.

Next, this polycrystalline silicon ingot was pulverized and classified, so that polycrystalline silicon particles having a purity of 99% were obtained as a negative electrode active material. The crystallite size of this polycrystalline silicon particles was 32 nm, and the median diameter was 10 μm. The above crystalline size was calculated by Scherrer equation using the half bandwidth of the (111) peak of silicon by powder x-ray diffraction. The above median diameter was defined as the diameter at which in the particle distribution measurement by a laser diffraction method, the cumulative volume reached 50%.

(2) Preparation of Negative Electrode Active Material Mixture Slurry

As a negative electrode binder, a polyimide resin having a molecular structure shown by the following formula (1) was used. This polyimide resin had thermoplastic properties, and the glass transition temperature thereof was 300° C. (Hereinafter, this polyimide resin was referred to as "thermoplastic polyimide resin".)

[Chem. 1]

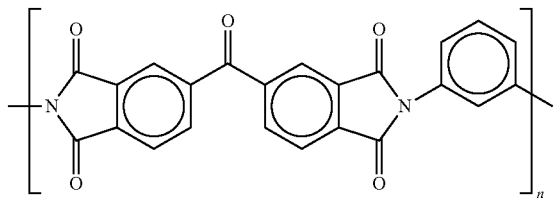

(1)

(In the formula, n represents an integer of 2 or more.)

For preparation of a negative electrode active material mixture slurry, a polyamide acid, which was a precursor of the above thermoplastic polyimide resin, dissolved in NMP was used in the form of vanish (hereinafter referred to as "thermoplastic polyimide resin precursor vanish"). A polyamide acid generates a polyimide resin by an imidization reaction (dehydration and condensation) with a heat treatment at 400° C.

Polyamide acids of respective experiment examples are each obtained by polymerization using as raw materials, 3,3',4,4'-benzophenone tetracarboxylic acid diethyl ester represented by one of the following chemical formulas (2), (3), and (4) and m-phenylenediamine represented by the following chemical formula (5) at an equivalent molar basis.

[Chem. 2]

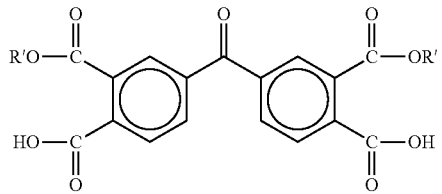

(2)

(In the formula, R' represents an ethyl group.)

[Chem. 3]

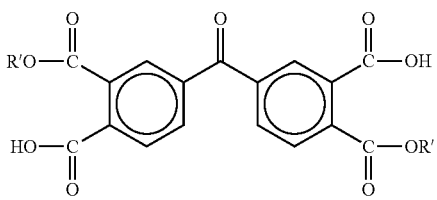

(3)

(In the formula, R' represents an ethyl group.)

[Chem. 4]

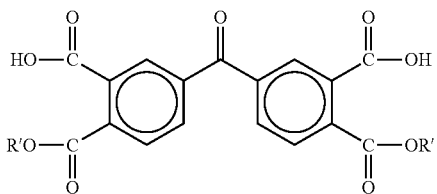

(4)

(In the formula, R' represents an ethyl group.)

[Chem. 5]

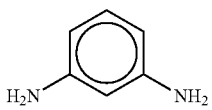

(5)

The above 3,3',4,4'-benzophenone tetracarboxylic acid diethyl ester can be formed by a reaction between 3,3',4,4'-benzophenone tetracarboxylic dianhydride represented by the following chemical formula (6) and 2 equivalents of ethanol in the presence of NMP.

[Chem. 6]

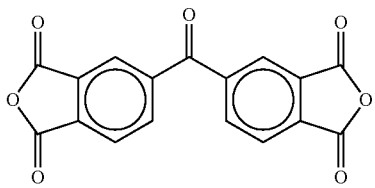

(6)

The thermoplastic polyimide resin precursor vanish was prepared in such a way that 3,3',4,4'-benzophenone tetracarboxylic acid diethyl ester (represented by one of the above chemical formulas (2) to (4)) and m-phenylenediamine (represented by the above chemical formula (5)) were dissolved at an equivalent molar ratio in NMP functioning as a solvent. A polyamide acid was obtained by polymerization performed in the NMP solvent between 3,3',4,4'-benzophenone tetracarboxylic acid diethyl ester and m-phenylenediamine. The dissolution concentration was set to 47 percent by mass on the polyimide resin basis obtained after imidization.

After 89.5 parts by mass of the negative electrode active material, 3.7 parts by mass of a graphite powder functioning as a negative electrode conductor and having an average particle diameter 3.5 μm, and 14.5 parts by mass (this corresponded to 6.8 parts by mass on the thermoplastic polyimide resin basis obtained after imidization) of the above thermoplastic polyimide resin precursor vanish were added to NMP functioning as a dispersant, the mixture thus obtained was kneaded, so that a negative electrode active material mixture slurry was prepared.

(3) Formation of Negative Electrode Active Material Mixture Layers

As a negative electrode collector, copper alloy foil having a thickness of 18 μm (C7025 alloy foil, the composition containing 96.2 percent by mass of Cu, 3 percent by mass of Ni, 0.65 percent by mass of Si, and 0.15 percent by mass of Mg) was used, two surfaces of the foil being processed by electrolytic copper roughening so as to have a surface roughness Ra (JIS B 0601-1994) of 0.25 μm and an average distance S between local peaks (JIS B 0601-1994) of 1.0 μm.

In an air atmosphere, after the above negative electrode active material mixture slurry was applied at 25° C. to two surfaces of this negative electrode collector and was then dried at 120° C., rolling was performed at 25° C. Subsequently, the negative electrode collector to which the negative electrode active material mixture slurry was applied and which was then rolled was cut into a rectangular form having a length of 320 mm and a width of 52 mm and was then heat-treated at 400° C. for 10 hours in an argon atmosphere to imidize (dehydration and condensation) the polyamide acid in the negative electrode active material mixture slurry applied on the surfaces of the negative electrode collector, so that negative electrode active material mixture layers were formed on the surfaces of the negative electrode collector. The amount of the negative electrode active material mixture layers on the negative electrode collector was 5.6 mg/cm$^2$, and the thickness of the negative electrode was 56 μm. Subsequently, a nickel plate functioning as a negative electrode collector tab was connected to an end portion of the negative electrode collector, so that a negative electrode plate was formed.

(Formation of Electrode Body)

By the use of the above positive electrode plate, the above negative electrode plate, and 2 separators each formed of a polyethylene-made porous film (thickness: 20 μm, length: 420 mm, width: 54.5 mm, sticking strength: 340 g, and porosity: 39%), the positive electrode plate and the negative electrode plate were arranged to face each other with the separators interposed therebetween. Next, winding was performed using a winding core having a diameter of 18 mm to form a wound shape. In this step, the positive electrode tab and the negative electrode tab were both arranged to be located at the outermost peripheral portions of the respective electrodes. Subsequently, the winding core was pulled out to form a wound electrode body, and furthermore, this wound electrode body was pressed to form a flat wound electrode body.

(Preparation of Nonaqueous Electrolyte Solution)

As a nonaqueous electrolyte solution, after lithium hexafluorophosphate (LiPF$_6$) functioning as an electrolyte salt was dissolved to have a concentration 1 mol/L in a nonaqueous solvent in which fluoroethylene carbonate (FEC) and methyl ethyl carbonate (MEC) were mixed together to have a ratio of 20:80 (volume ratio at 1 atmosphere and 25° C.), a carbon dioxide gas was dissolved in this solution to have a concentration of 0.4 percent by mass, so that the nonaqueous electrolyte solution was prepared.

(Formation of Battery)

After the above flat wound electrode body and the above nonaqueous electrolyte solution were inserted between casings at 25° C. and 1 atmosphere in a $CO_2$ atmosphere, the casings each being formed from an aluminum laminate in which a nylon layer was arranged on one surface of a metal layer of aluminum and a polypropylene layer was arranged on the other surface thereof, the casings was sealed with each other, so that a nonaqueous electrolyte secondary battery according to Experimental Example 1 was formed. The design capacity obtained when the nonaqueous electrolyte secondary battery according to Experimental Example 1 was charged until the battery voltage reached 4.35 V (a positive electrode potential of 4.5 V with reference to lithium) was 850 mAh.

[Structure of Nonaqueous Electrolyte Secondary Battery]

Figure 2:
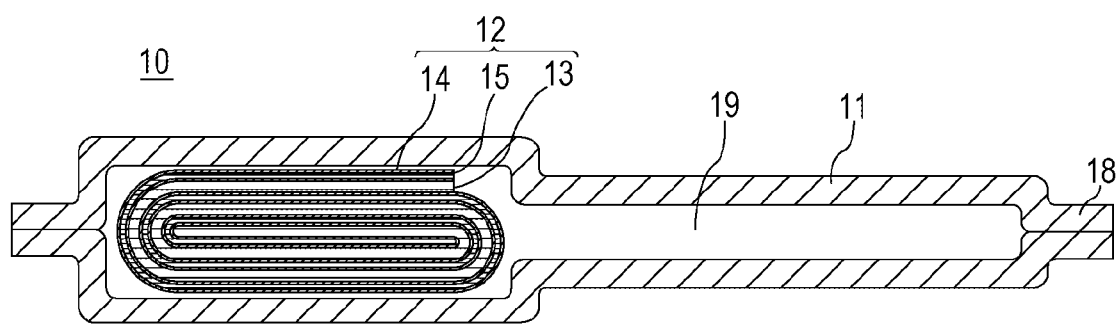
FIG. 2 is a cross-sectional view taken along the line II-II of FIG. 1.

Next, the structure of a laminate type nonaqueous electrolyte secondary battery 10 formed in Experimental Example 1 will be described with reference to FIGS. 1 and 2. The nonaqueous electrolyte secondary battery 10 includes laminate casings 11 each covering the outside periphery thereof, a flat wound electrode body 12, and a nonaqueous electrolyte solution. The wound electrode body 12 has the structure in which a negative electrode plate 14 and a positive electrode plate 13 having at least one surface on which an inorganic particle layer (not shown in the figure) is formed are flatly wound with at least one separator 15 interposed therebetween so as to be electrically insulated from each other. A positive electrode collector tab 16 is connected to the positive electrode plate 13 of the wound electrode body 12, and as is the case described above, a negative electrode collector tab 17 is connected to the negative electrode plate 14. The wound electrode body 12 is sealed together with the nonaqueous electrolyte solution between the laminate casings 11 each covering the outside periphery, and outside peripheral end portions of the laminate casings 11 are closely sealed with each other by heat seal portions 18.

In addition, in the nonaqueous electrolyte secondary battery 10 formed in Experimental Example 1, an extending portion 19 is allowed to remain between the laminate casings 11 at one side of the wound electrode body 12 so that the nonaqueous electrolyte solution is easily charged. This extending portion 19 is a portion to be used, for example, for analysis of a gas component generated during charge and discharge and/or a component formed in the nonaqueous electrolyte solution, and when the nonaqueous electrolyte secondary battery is formed as a final product, heat sealing may be performed at a position along the line A-A in FIG. 1.

In Experimental Examples 2 to 4, when the inorganic particle layer was formed in the formation of the positive electrode plate, by the use of a rare earth element compound different from the rare earth element compound (erbium oxide) used in Experimental Example 1, a nonaqueous electrolyte secondary battery was formed.

Experimental Example 2

Except that yttrium oxide was used as the rare earth element compound instead of using erbium oxide, and the content of the rare earth element compound was adjusted so that the mass ratio of aluminum oxide (AKP3000) to yttrium oxide was 500:7 (at this ratio, the rate of yttrium oxide contained in the inorganic particle layer was 2.1 percent by mass on the rare earth element basis with respect to the total amount of all the elements other than non-metal elements), a battery was formed in a manner similar to that of the above Experimental Example 1.

Experimental Example 3

Except that lanthanum oxide was used as the rare earth element compound instead of using erbium oxide, and the content of the rare earth element compound was adjusted so that the mass ratio of aluminum oxide (AKP3000) to lanthanum oxide was 500:9 (at this ratio, the rate of lanthanum oxide contained in the inorganic particle layer was 2.9 percent by mass on the rare earth element basis with respect to the total amount of all the elements other than non-metal elements), a battery was formed in a manner similar to that of the above Experimental Example 1.

Experimental Example 4

Except that neodymium oxide was used as the rare earth element compound instead of using erbium oxide, and the content of the rare earth element compound was adjusted so that the mass ratio of aluminum oxide (AKP3000) to neodymium oxide was 500:10 (at this ratio, the rate of neodymium oxide contained in the inorganic particle layer was 3.2 percent by mass on the rare earth element basis with respect to the total amount of all the elements other than non-metal elements), a battery was formed in a manner similar to that of the above Experimental Example 1.

Experimental Example 5

Except that when the inorganic particle layers were formed, the inorganic particle layers were formed only using aluminum oxide (AKP3000) as the inorganic particles without using the rare earth element compound, a battery was formed in a manner similar to that of the above Experimental Example 1.

[High-Temperature Charge Discharge Cycle Test]

On each of the nonaqueous electrolyte secondary batteries of Experimental Examples 1 to 5 obtained as described above, after initial charge and discharge (charge and discharge at a first cycle) were performed under the following conditions (A), charge and discharge (charge and discharge performed at a second cycle and thereafter) were then repeatedly performed under the following conditions (B).

(A) Charge and Discharge at First Cycle

Temperature: 25° C.

Charge Conditions: After constant current charge was performed at a current of 43 mA for 1 hour, charge was performed at a constant current of 1 It (=850 mA) until the battery voltage reached 4.35 V, and after the battery voltage reached 4.35 V, charge was performed at a constant voltage of 4.35 V until the current reached 1/20 It (43 mA).

Discharge conditions: Discharge was performed at a constant current of 1 It (=850 mA) until the battery voltage reached 2.75 V.

(B) Charge and Discharge at 2nd to 40th Cycle

Temperature: 45° C.

Charge Conditions: Constant current charge was performed at a current of 1 It (=850 mA) until the battery voltage reached 4.35 V, and after the battery voltage reached 4.35 V, constant voltage charge was performed at a constant voltage of 4.35 V until the current reached 1/20 It (43 mA).

Discharge conditions: Discharge was performed at a constant current of 1 It (=850 mA) until the battery voltage reached 2.75 V.

In this cycle test, the discharge capacity at the 1st cycle and that at the 40th cycle were measured, and the capacity retention rate was calculated based on the following equation. The results are collectively shown in Table 1.

Capacity retention rate (%)=(discharge capacity at 40th cycle/discharge capacity at 1st cycle)×100

TABLE 1

| | Negative Electrode Active Material | Inorganic particle layer | | Capacity Retention Rate after 40 Cycles (%) |
| --- | --- | --- | --- | --- |
| | | Rare Earth Element Compound (Content) | $Al_2O_3$ (Content) | |
| Experimental Example 1 | Si | $Er_2O_3$ (3.6 mass %) | $Al_2O_3$ (96.4 mass %) | 85 |
| Experimental Example 2 | Si | $Y_2O_3$ (2.1 mass %) | $Al_2O_3$ (97.9 mass %) | 78 |
| Experimental Example 3 | Si | $La_2O_3$ (2.9 mass %) | $Al_2O_3$ (97.1 mass %) | 66 |
| Experimental Example 4 | Si | $Nd_2O_3$ (3.2 mass %) | $Al_2O_3$ (96.8 mass %) | 80 |
| Experimental Example 5 | Si | — | $Al_2O_3$ (100 mass %) | 61 |

From the results shown in Table 1, in the batteries of Experimental Examples 1 to 4 in which the rare earth element compound is contained in the inorganic particle layer formed on the surface of the positive electrode active material mixture layer, it can be confirmed that compared to the battery of Experimental Example 5 in which the rare earth element compound is not contained in the inorganic particle layer formed on the surface of the positive electrode active material mixture layer, the cycle characteristics in a high-temperature environment are improved.

The reason the effect of improving high-temperature cycle characteristics is obtained is estimated as described below. That is, when a decomposed substance generated by decomposition of the electrolyte solution at a positive electrode side is moved toward the negative electrode, and/or when a decomposed substance generated by decomposition of the electrolyte solution at a negative electrode side is moved toward the positive electrode, since the rare earth element compound is present in the inorganic particle layer, the decomposed substance is effectively trapped (adsorbed).

Accordingly, it is believed that if the rare earth element compound-containing inorganic particle layer is present at a position at which the movement of electrolyte-solution decomposed substances can be controlled, the above effect is obtained. Hence, in the above Experimental Examples 1 to 4, although the nonaqueous electrolyte secondary battery was used in which the rare earth element compound-containing inorganic particle layer was formed only at a positive electrode side, the rare earth element compound-containing inorganic particle layer may be formed only on the surface of the negative electrode active material mixture layer and may also be formed for each of the positive electrode and the negative electrode.

In addition, since it is estimated that the effect described above can be obtained by suppressing the movement of electrolyte-solution decomposed substances using the rare earth element compound-containing inorganic particle layer, regardless of the type of positive electrode active material, the type of negative electrode active material, the composition of the nonaqueous electrolyte solution, and the type of rare earth element compound, the present invention may be carried out.

SECOND EXPERIMENTAL EXAMPLE

Experimental Example 6

Formation of Positive Electrode Plate

Except that when the inorganic particle layers were formed, the inorganic particle layers were formed only using erbium oxide as the inorganic particles without using aluminum oxide, a positive electrode plate was formed in a manner similar to that of the above Experimental Example 1.
(Formation of Negative Electrode Plate)

An artificial graphite functioning as a negative electrode active material and an SBR (styrene-butadiene rubber) functioning as a binder were added to an aqueous solution in which CMC (sodium carboxy methylcellulose) functioning as a thickener was dissolved in water and were then kneaded together so that the mass ratio of the negative electrode active material, the binder, and the thickener was set to 98:1:1, so that a negative electrode active material mixture slurry was formed. After this negative electrode active material mixture slurry was applied as uniformly as possible to two surfaces of a negative electrode collector formed of copper foil and was then dried, rolling was performed using rolling rollers, so that negative electrode active material mixture layers were formed on the surfaces of the negative electrode collector. The amount of the negative electrode active material mixture layers on the negative electrode collector was 23 mg/cm$^2$, and the thickness of the negative electrode was 154 μm. Subsequently, a nickel plate functioning as a negative electrode collector tab was connected to an end portion of the negative electrode collector, so that a negative electrode plate was formed.
(Preparation of Nonaqueous Electrolyte Solution)

As a nonaqueous electrolyte solution, lithium hexafluorophosphate (LiPF$_6$) functioning as an electrolyte was dissolved in a nonaqueous solvent in which ethylene carbonate (EC) and diethylene carbonate (DEC) were mixed at a volume ratio of 3:7 so as to obtain a concentration of 1.2 mol/L. Furthermore, 2.0 percent by mass of vinylene carbonate (VC) was added to the total amount of the nonaqueous electrolyte and was dissolved therein, so that the nonaqueous electrolyte solution was prepared.
(Formation of Battery)

Except that the positive electrode plate, the negative electrode plate, and the nonaqueous electrolyte solution described above were used, a battery was formed in a manner similar to that of the above Experimental Example 1. The structure of the nonaqueous electrolyte secondary battery formed in Experimental Example 6 was similar to that of the above Experimental Example 1. In addition, the design capacity of this battery obtained when this battery was charged until the battery voltage reached 4.4 V (a positive electrode potential of 4.5 V with reference to lithium) was 850 mAh.

Experimental Example 7

Except that the content of the rare earth element compound was set so that the mass ratio of aluminum oxide (AKP3000) to erbium oxide was 25:75 (at this ratio, the rate of erbium oxide contained in the inorganic particle layer was 83.2 percent by mass on the rare earth element basis with respect to the total amount of all the elements other than non-metal elements), a battery was formed in a manner similar to that of the above Experimental Example 6.

Experimental Example 8

Except that the content of the rare earth element compound was set so that the mass ratio of aluminum oxide (AKP3000) to erbium oxide was 50:50 (at this ratio, the rate of erbium oxide contained in the inorganic particle layer was 62.3 percent by mass on the rare earth element basis with respect to the total amount of all the elements other than non-metal elements), a battery was formed in a manner similar to that of the above Experimental Example 6.

Experimental Example 9

Except that the content of the rare earth element compound was set so that the mass ratio of aluminum oxide (AKP3000) to erbium oxide was 75:25 (at this ratio, the rate of erbium oxide contained in the inorganic particle layer was 35.5 percent by mass on the rare earth element basis with respect to the total amount of all the elements other than non-metal elements), a battery was formed in a manner similar to that of the above Experimental Example 6.

Experimental Example 10

Except that the content of the rare earth element compound was set so that the mass ratio of aluminum oxide (AKP3000) to erbium oxide was 95:5 (at this ratio, the rate of erbium oxide contained in the inorganic particle layer was 8.0 percent by mass on the rare earth element basis with respect to the total amount of all the elements other than non-metal elements), a battery was formed in a manner similar to that of the above Experimental Example 6.

Experimental Example 11

Except that the content of the rare earth element compound was set so that the mass ratio of aluminum oxide (AKP3000) to erbium oxide was 99:1 (at this ratio, the rate of erbium oxide contained in the inorganic particle layer was 1.6 percent by mass on the rare earth element basis with respect to the total amount of all the elements other than non-metal elements), a battery was formed in a manner similar to that of the above Experimental Example 6.

Experimental Example 12

Except that when the inorganic particle layers were formed, the inorganic particle layers were formed only using aluminum oxide (AKP3000) as the inorganic particles without using the rare earth element compound, a battery was formed in a manner similar to that of the above Experimental Example 6.

[High-Temperature Charge Discharge Cycle Test]

On each of the nonaqueous electrolyte secondary batteries of Experimental Examples 6 to 12 obtained as described above, after initial charge and discharge (charge and discharge at a first cycle) were performed at 25° C. under the following conditions (C), charge and discharge (charge and discharge performed at a second cycle and thereafter) were repeatedly performed at 45° C. under the following conditions (D).

(C) Charge and Discharge at First Cycle
Temperature: 25° C.
Charge Conditions: After constant current charge was performed at a current of 43 mA for 1 hour, charge was performed at a constant current of 1 It (=850 mA) until the battery voltage reached 4.4 V, and after the battery voltage reached 4.4 V, charge was performed at a constant voltage of 4.4 V until the current reached 1/20 It (43 mA).
Discharge conditions: Discharge was performed at a constant current of 1 It (=850 mA) until the battery voltage reached 2.75 V.
(D) Charge and Discharge at 2nd to 500th Cycle
Temperature: 45° C.
Charge Conditions: Constant current charge was performed at a current of 1 It (=850 mA) until the battery voltage reached 4.4 V, and after the battery voltage reached 4.4 V, constant voltage charge was performed at a constant voltage of 4.4 V until the current reached 1/20 It (43 mA).
Discharge conditions: Discharge was performed at a constant current of 1 It (=850 mA) until the battery voltage reached 2.75 V.

In this cycle test, the discharge capacity at the 1st cycle and that at the 500th cycle were measured, and the capacity retention rate was calculated based on the following equation. The results are collectively shown in Table 2.

Capacity retention rate (%)=(discharge capacity at 500th cycle/discharge capacity at 1st cycle)×100

TABLE 2

| | Negative Electrode Active Material | Inorganic particle layer | | Capacity Retention Rate after 500 Cycles (%) |
| | | Rare Earth Element Compound (Content) | $Al_2O_3$ (Content) | |
| --- | --- | --- | --- | --- |
| Experimental Example 6 | C | $Er_2O_3$ (100 mass %) | — | 70 |
| Experimental Example 7 | C | $Er_2O_3$ (83.2 mass %) | $Al_2O_3$ (16.8 mass %) | 78 |
| Experimental Example 8 | C | $Er_2O_3$ (62.3 mass %) | $Al_2O_3$ (37.7 mass %) | 78 |
| Experimental Example 9 | C | $Er_2O_3$ (35.5 mass %) | $Al_2O_3$ (64.5 mass %) | 85 |
| Experimental Example 10 | C | $Er_2O_3$ (8.0 mass %) | $Al_2O_3$ (92.0 mass %) | 74 |
| Experimental Example 11 | C | $Er_2O_3$ (1.6 mass %) | $Al_2O_3$ (98.4 mass %) | 68 |
| Experimental Example 12 | C | — | $Al_2O_3$ (100 mass %) | 62 |

From the results shown in Table 2, even when the carbon material is used as the negative electrode active material, as in the case of the above Experimental Example 1 in which Si is used as the negative electrode active material, it is confirmed that the cycle characteristics in a high-temperature environment of each the batteries of Experimental Examples 6 to 11 in which the rare earth element compound is contained in the inorganic particle layer formed on the surface of the positive electrode active material mixture layer are improved as compared to those of the battery of Experimental Example 12 in which no rare earth element compound is contained in the inorganic particle layer formed on the surface of the positive electrode active material mixture layer.

As in the case in which Si is used as the negative electrode active material, it is presumed that when a decomposed substance generated by decomposition of the electrolyte solution at a positive electrode side is moved to the negative electrode and/or when a decomposed substance generated by decomposition of the electrolyte solution at a negative electrode side is moved to the positive electrode, since the decomposed substances are effectively trapped (adsorbed) by the presence of the rare earth element compound in the inorganic particle layer, the above effect of improving high-temperature cycle characteristics can be obtained.

In addition, from the results shown in Table 2, it is confirmed that the cycle characteristics in a high-temperature environment of each of the batteries of Experimental Examples 7 to 10 in which the inorganic particle layer containing aluminum oxide and erbium oxide as the inorganic particles at a predetermined ratio is used are specifically improved as compared to those of the battery of Experimental Example 6 in which erbium oxide is only contained as the inorganic particles, the battery of Experimental Example 12 in which aluminum oxide is only contained as the inorganic particles, and the battery of Experimental Example 11 in which although aluminum oxide and erbium oxide are both contained as the inorganic particles, the content of erbium oxide is smaller than that of each of the batteries of Experimental Examples 7 to 10. That is, it is found that the capacity retention rate of each of the batteries of Experimental Examples 7 to 10 is not in the range of from the capacity retention rate of the battery of Experimental Example 6 to that of the battery of Experimental Example 12 and is more than the range described above (for example, since the capacity retention rate of the battery of Experimental Example 6 is 70% and that of the battery of Experimental Example 12 is 62%, although the capacity retention rate of each of the batteries of Experimental Examples 7 to 10 in which the inorganic particle layer containing erbium oxide used in Experimental Example 6 and aluminum oxide used in Experimental Example 12 is used is estimated to be 62% to 70%, the actual capacity retention rate is more than 74%, so that it is found that improvement more than the estimated range can be achieved).

From the results described above, it is found that the content of the rare earth element compound to be contained in the inorganic particle layer is preferably set to 1 to 100 percent by mass on the rare earth element basis with respect to the total amount of all the remaining elements obtained by subtracting non-metal elements from all the elements forming the inorganic particle layer. The reason for this is that when the content of the rare earth element compound contained in the inorganic particle layer is excessively small, the above effect may not be sufficiently obtained in some cases. In addition, it is found that in terms of the capacity retention rate and the cost, the content is preferably set to 1 to 85 percent by mass and particularly preferably set to 8 to 85 percent by mass.

The reasons the experimental results as described above are obtained are believed as follows. In consideration of the above effect (by the presence of the rare earth element compound in the inorganic particle layer, the decomposed substances of the electrolyte solution generated at the positive electrode and the negative electrode sides are effectively trapped), it is supposed that when the inorganic particle layer is formed only from the rare earth element compound as in the battery of Experimental Example 6, the effect can be more effectively obtained, and the decrease in capacity retention rate can be further suppressed. However, in this Experimental Example, since the mass of the inorganic particle layer is controlled to be constant, and the weight of erbium oxide per one mole is larger than that of aluminum oxide, the thickness of the inorganic particle layer in which erbium oxide is only contained becomes smaller than that of the inorganic particle layer in which aluminum oxide is contained. As a result, it is presumed that the above effect cannot be sufficiently obtained, and that the effect of suppressing the decrease in capacity retention rate is adversely decreased as compared to that of each of the batteries of Experimental Examples 7 to 10.

Furthermore, from the results shown in Tables 1 and 2, the capacity retention rate of the battery of Experimental Example 1 in which Si is used as the negative electrode active material and in which the inorganic particle layer containing 3.6 percent by mass of erbium oxide on the rare earth element basis is used is improved to 85% as compared to a capacity retention rate of 61% of the battery of Experimental Example 5 in which aluminum oxide is only contained in the inorganic particle layer. On the other hand, when the carbon material is used as the negative electrode active material, although the capacity retention rate of each of the batteries of Experimental Examples 10 and 11 in which 1.6 to 8.0 percent by mass of erbium oxide on the rare earth element basis are contained in the inorganic particle layers, respectively, is improved as compared to a capacity retention rate of 62% of the battery of Experimental Example 12 in which aluminum oxide is only contained in the inorganic particle layer, the capacity retention rates thereof are only improved to 68% and 74%, respectively.

From the results described above, it is found that when inorganic particle layers containing approximately the same amount of rare earth elements are used, the effect of improving the cycle characteristics is superior when a Si-containing negative electrode active material is used to that obtained when a carbon material-containing negative electrode active material is used. Hence, as the negative electrode active material, a Si-containing negative electrode active material is more preferably used.

The reason the experimental results as described above are obtained is presumed as described below. That is, when the Si-containing negative electrode active material is used, the active material is partially liable to be fractured by expansion and contraction thereof in association with charge and discharge, and a new surface is liable to be generated. In addition, a new reaction occurs on this new surface, the generation of a decomposed substance of the electrolyte solution at a negative electrode side is promoted, and as a result, the amount of the decomposed substance moved from the negative electrode to the positive electrode is increased. It is believed that although the influence caused by using the Si-containing negative electrode active material as described above is increased as the amount of Si in the negative electrode active material is increased, even when the content of Si and a Si-containing compound on the Si basis with respect to the carbon material is 0.5 percent by mass or more, the influence may be still observed. In particular, when the content is 2 percent by mass or more and particularly 5 percent by mass or more, the influence is increased, and in this case, when the inorganic particle layer containing a rare earth element compound is imparted to the positive electrode or the negative electrode, degradation during high-temperature cycles can be further suppressed.

As a rare earth element forming the rare earth element compound, for example, yttrium, lanthanum, cerium, praseodymium, neodymium, samarium, europium, gadolinium, terbium, dysprosium, holmium, erbium, thulium, ytterbium, lutetium, and scandium may be mentioned. Among those mentioned above, praseodymium, neodymium, samarium, europium, gadolinium, terbium, dysprosium, holmium, erbium, thulium, ytterbium, lutetium, and scandium are preferable, and neodymium and erbium are particularly preferable. Those rare earth elements may be used alone, or a mixture containing at least two types thereof may also be used. In addition, a compound of a misch metal, which is a mixture of rare earth elements, may also be used.

As the rare earth element compound thereof, an oxide, a hydroxide, an oxyhydroxide, a carbonic acid compound, a phosphoric acid compound, a nitric acid compound, a sulfuric acid compound, an acetic acid compound, an oxalic acid compound, and a fluorinated compound may be used alone, or a mixture containing at least two types thereof may also be used. Among those mentioned above, an oxide, a hydroxide, an oxyhydroxide, a phosphoric acid compound, and a fluorinated compound are particularly preferably used because a significant effect of trapping decomposed substances of the electrolyte solution can be obtained.

To the inorganic particle layer, other inorganic particles are preferably added besides the rare earth element compound. Particles which have been known as inorganic particles may be used, and for example, an oxide or a phosphoric acid compound, which uses at least one of titanium, aluminum, silicon, magnesium, zirconium, molybdenum, tungsten, and the like, may be mentioned, and in addition, an oxide or a phosphoric acid compound, the surface of which is processed by a hydroxide or the like, may also be used. Among those mentioned above, titanium, aluminum, silicon, and magnesium are preferable. The reason for this is that compared to zirconium, molybdenum, tungsten, and the like, by the use of a small amount of titanium, aluminum, silicon, and magnesium, the inorganic particles of the rare earth element compound can be spread not only in the entire plane direction but also in a thickness direction.

The thickness of the inorganic particle layer is preferably 1 to 25 µm. The reasons for this are that when the thickness is excessively large, the volume of a substance having no contribution to a charge and discharge reaction is excessively increased, and the capacity of the battery may not be increased in some cases, and that when the thickness is excessively small, the effect of trapping decomposed substances of the electrolyte solution may not be sufficiently obtained.

As the positive electrode active material, any known positive electrode active materials of nonaqueous electrolyte secondary batteries may be used as described above, and for example, a lithium transition metal composite oxide, such as a lithium cobalt composite oxide, a lithium composite oxide of Ni—Co—Mn, a lithium composite oxide of Ni—Mn—Al, a composite oxide of Ni—Co—Al, a lithium composite oxide of Ni—Mn, or an olivine type transition metal oxide (represented by $LiMPO_4$, and M represents an element selected from Fe, Mn, Co, and Ni) containing iron, manganese, or the like may be mentioned. As the positive electrode active material, those oxides may be used alone, or at least two types thereof may also be used by mixing. In addition, in the above lithium transition metal composite oxide, at least one substance, such as Al, Mg, Ti, or Zr, may be solid-soluted or may be contained in grain boundaries.

In addition, as the above lithium composite oxide of Ni—Co—Mn, although a lithium composite oxide having a known composition in which the molar ratio of Ni, Co, and Mn is 1:1:1, 5:3:2, 5:2:3, 6:2:2, 7:1:2, 7:2:1, or 8:1:1 may be used, in particular, in order to increase the positive electrode capacity, an oxide having a ratio of Ni and/or Co larger than that of Mn is preferably used.

In the case in which positive electrode active materials which belong to the same type are used, or in the case in which different types of positive electrode active materials are used, as the positive electrode active materials, materials having the same particle diameter may be used, and material having different particle diameters may also be used.

In the positive electrode active material mixture layer, a compound containing at least one type of element selected from the group consisting of a rare earth, zirconium, aluminum, magnesium, titanium, tungsten, niobium, and tantalum is preferably contained, and in particular, as the positive electrode active material, a compound containing at least one type of element selected from the group consisting of a rare earth, zirconium, aluminum, magnesium, titanium, tungsten, niobium, and tantalum is preferably adhered to particle surfaces of a lithium transition metal composite oxide.

In addition, as a solvent of the nonaqueous electrolyte, solvents which have been used in the past may be used. For example, there may be used a cyclic carbonate, such as ethylene carbonate, propylene carbonate, butylene carbonate, or vinylene carbonate; a chain carbonate, such as dimethyl carbonate, methyl ethyl carbonate, or diethyl carbonate; a compound including an ester, such as methyl acetate, ethyl acetate, propyl acetate, methyl propionate, ethyl propionate, or γ-butyrolactone; a compound including a sulfone group such as propane sultone; a compound including an ether, such as 1,2-dimethoxyethane, 1,2-diethoxyethane, tetrahydrofuran, 1,3-dioxane, 1,4-dioxane, or 2-methyltetrahydrofuran; a compound including a nitrile, such as butyronitrile, valeronitrile, n-heptane nitrile, succinonitrile, glutaric nitrile, adiponitrile, pimelonitrile, 1,2,3-propanetricarbonitrile, or 1,3,5-pentanotricarbonitrile; and a compound including an amide, such as dimethylformamide.

In particular, a solvent in which at least one H of each of the above compounds is substituted by F may also be preferably used. In addition, those compounds mentioned above may be used alone, or at least two thereof may be used in combination, and in particular, a solvent in which a cyclic carbonate and a chain carbonate are mixed in combination and a solvent in which a small amount of a compound including a nitrile and/or a compound including an ether is further mixed with the solvent described above in combination are preferable.

As a solute of the nonaqueous electrolyte, any solutes which have been used in the past may be used, and besides $LiPF_6$, $LiBF_4$, $LiN(SO_2F)_2$, $LiN(SO_2CF_3)_2$, $LiN(SO_2C_2F_5)_2$, $LiPF_{6-x}(C_nF_{2n-1})_x$ [where $1<x<6$ holds, and n represents 1 or 2], and the like, a lithium salt in which an oxalato complex functions as an anion may be mentioned by way of example. As this lithium salt in which an oxalato complex functions as an anion, besides LiBOB [lithium bis(oxalato)borate], a lithium salt having an anion in which $C_2O_4^{2-}$ is coordinated to a central atom, such as $Li[M(C_2O_4)_xR_y]$ (in the formula, M represents an element selected from transition metals and elements of Groups IIIb, IVb, and Vb of the periodic table, R represents a group selected from a halogen, an alkyl group, and a halogenated alkyl group, x represents a positive integer, and y represents 0 or a positive integer), may be used. In particular, for example, $Li[B(C_2O_4)F_2]$, $Li[P(C_2O_4)F_4]$, and $Li[P(C_2O_4)_2F_2]$ may be mentioned. However, in order to form a stable coating film on the surface of the negative electrode even in a high-temperature environment, LiBOB is most preferably used.

In addition, the solutes described above may be used alone, and at least two types thereof may also be used by mixing. Although the concentration of the solute is not particularly limited, 0.8 to 1.7 moles per one liter of the electrolyte solution is preferable.

As a separator, any separators which have been used in the past may be used. In particular, besides a separator formed of a polyethylene, a separator formed of a polyethylene provided with a polyethylene layer on the surface thereof and a separator formed by applying a resin, such as an aramid-based resin, on the surface of a separator formed of a polyethylene may also be used.

In the above Experimental Examples, although the case in which silicon and a carbon material are used as the negative electrode active material is shown by way of example, any materials which have been used in the past as the negative electrode active material may be used, and for example, a carbon material capable of absorbing and desorbing lithium, a metal capable of forming an alloy with lithium, or an alloy compound containing the metal mentioned above may be mentioned.

As examples of the carbon material functioning as the negative electrode active material, for example, there may be used graphites, such as an artificial graphite, a hardly graphitizable carbon, or a natural graphite, or cokes, and as the alloy compound, a compound containing at least one type of element capable of forming an alloy with lithium may be mentioned. In particular, as the element capable of forming an alloy with lithium, silicon and tin are preferable, and for example, a silicon oxide or a tin oxide, each of which is formed from silicon or tin bonded with oxygen, may also be used. In addition, a compound formed by mixing the above carbon material with a compound of silicon or tin may also be used.

Besides those described above, as the negative electrode active material, a compound, such as lithium titanate, having a high charge and discharge potential with reference to that of metal lithium as compared to that of a carbon material or the like may also be used although the energy density is decreased. In addition, besides silicon and a silicon alloy, a silicon oxide [$SiO_x$ ($0<x<2$ and in particular, $0<x<1$ is preferable)] may also be used.

REFERENCE SIGNS LIST

10 nonaqueous electrolyte secondary battery
11 laminate casing
12 wound electrode body
13 positive electrode plate
14 negative electrode plate
15 separator
16 positive electrode collector tab
17 negative electrode collector tab
18 heat seal portion
19 extending portion

The invention claimed is:

1. A nonaqueous electrolyte secondary battery comprising:
    a positive electrode in which a positive electrode active material mixture layer is formed;
    a negative electrode in which a negative electrode active material mixture layer is formed;
    a nonaqueous electrolyte; and
    a separator,
    wherein on at least one surface of the positive electrode active material mixture layer and the negative electrode active material mixture layer, an inorganic particle layer is formed, which is a layer comprising a rare earth element compound mixed with a binder, and
    wherein a rare earth element forming the rare earth element compound includes at least one selected from the group consisting of praseodymium, neodymium, samarium, europium, gadolinium, terbium, dysprosium, holmium, erbium, thulium, ytterbium, lutetium, and scandium, and
    wherein the content of the rare earth element compound in the inorganic particle layer is 1 to 100 percent by mass on the rare earth element basis with respect to the total amount of elements forming the inorganic particle layer other than non-metal elements.

2. The nonaqueous electrolyte secondary battery according to claim 1,
    wherein the content of the rare earth element compound in the inorganic particle layer is 1 to 85 percent by mass.

3. The nonaqueous electrolyte secondary battery according to claim 1,
    wherein the content of the rare earth element compound in the inorganic particle layer is 8 to 85 percent by mass.

4. The nonaqueous electrolyte secondary battery according to claim 1,
    wherein the thickness of the inorganic particle layer is 1 to 25 μm.

5. The nonaqueous electrolyte secondary battery according to claim 1,
    wherein the rare earth element includes at least one type selected from neodymium and erbium.

6. The nonaqueous electrolyte secondary battery according to claim 1,
    wherein the rare earth element compound includes at least one type selected from the group consisting of a hydroxide, an oxyhydroxide, an oxide, a phosphoric acid compound, and a carbonic acid compound.

7. The nonaqueous electrolyte secondary battery according to claim 1,
    wherein the inorganic particle layer contains a compound of at least one type of element selected from titanium, aluminum, silicon, magnesium, zirconium, molybdenum, and tungsten.

8. The nonaqueous electrolyte secondary battery according to claim 7,
    wherein the inorganic particle layer contains a compound of at least one type of element selected from titanium, aluminum, silicon, and magnesium.

9. The nonaqueous electrolyte secondary battery according to claim 1,
    wherein the negative electrode includes a negative electrode active material containing Si.

* * * * *